US012626192B2

(12) United States Patent
Xiao et al.

(10) Patent No.: US 12,626,192 B2
(45) Date of Patent: May 12, 2026

(54) SYSTEM AND METHOD FOR DETECTING INVALID IDENTIFICATION DOCUMENTS USING SYNTHETIC DATA FOR MODEL TRAINING

(71) Applicant: Socure, Inc., Incline Village, NV (US)

(72) Inventors: Feng Xiao, Incline Village, NV (US); Suchita Bhinge, Incline Village, NV (US); Yaguang Li, Incline Village, NV (US); Pablo Ysrrael Abreu, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 18/901,654

(22) Filed: Sep. 30, 2024

(65) Prior Publication Data

US 2026/0094051 A1    Apr. 2, 2026

(51) Int. Cl.
*G06N 20/00* (2019.01)
*G06K 7/14* (2006.01)

(52) U.S. Cl.
CPC ........... *G06N 20/00* (2019.01); *G06K 7/1417* (2013.01)

(58) Field of Classification Search
CPC .... G06K 7/1404; G06K 7/1417; G06N 20/00; G06N 20/20; G06V 20/95
See application file for complete search history.

(56) References Cited

U.S. PATENT DOCUMENTS

2020/0184212 A1* 6/2020 Anthony Samy .... G06N 3/0895
2023/0222775 A1* 7/2023 Stonehouse .......... G06K 7/1413
382/159

FOREIGN PATENT DOCUMENTS

WO        2024144931 A1      7/2024

OTHER PUBLICATIONS

European Search Report and Written Opinion issued in application No. EP 25181226.9 dated Aug. 14, 2025.

* cited by examiner

*Primary Examiner* — Laura A Gudorf
(74) *Attorney, Agent, or Firm* — Charles B. Lobsenz; Brian H. Buck; Potomac Law Group, PLLC

(57)        ABSTRACT

A method and system which processes images representing identification documents such as driver's licenses and passports and uses machine learning techniques wherein a model is trained and the resulting model is used in production to more effectively and accurately detect whether the source identification document has been invalidated. According to the teachings herein, the disclosed method and system can improve the detection of invalid identification documents even where there are limited source documents representing invalid documents available for model training thru the generation of synthetic training data which can be used to enhance model training.

20 Claims, 7 Drawing Sheets

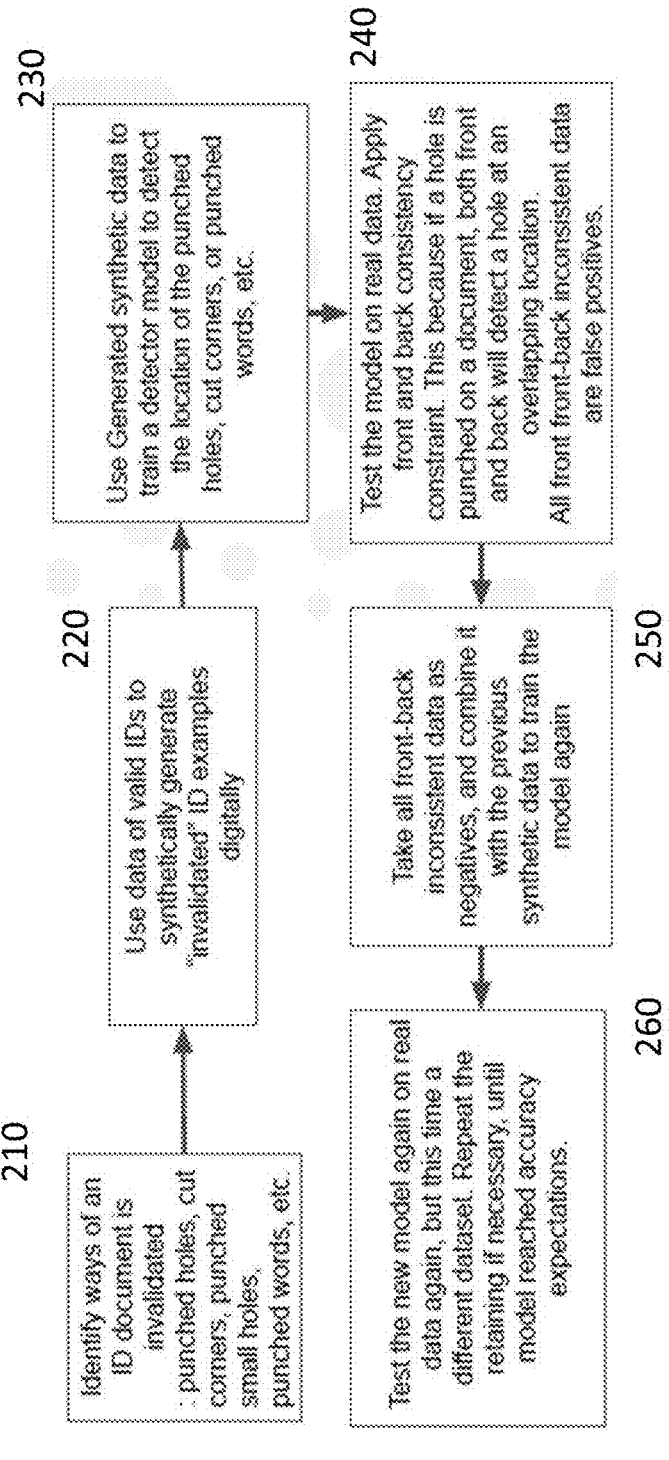

210

Identify ways of an ID document is invalidated : punched holes, cut corners, punched small holes, punched words, etc.

220

Use data of valid IDs to synthetically generate "invalidated" ID examples digitally

230

Use Generated synthetic data to train a detector model to detect the location of the punched holes, cut corners, or punched words, etc.

240

Test the model on real data. Apply front and back consistency constraint. This because if a hole is punched on a document, both front and back will detect a hole at an overlapping location. All front front-back inconsistent data are false positives.

250

Take all front-back inconsistent data as negatives, and combine it with the previous synthetic data to train the model again

260

Test the new model again on real data again, but this time a different dataset. Repeat the retraining if necessary, until model reached accuracy expectations.

FIG. 2

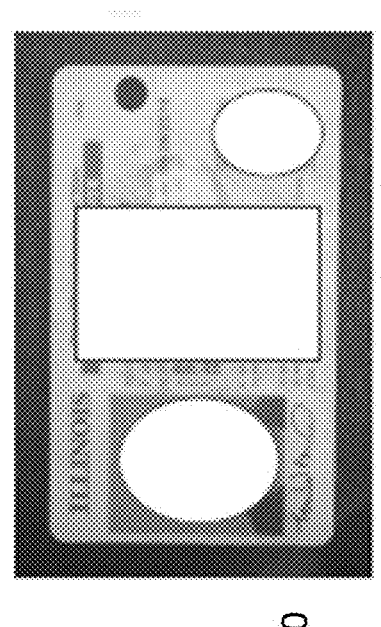
320
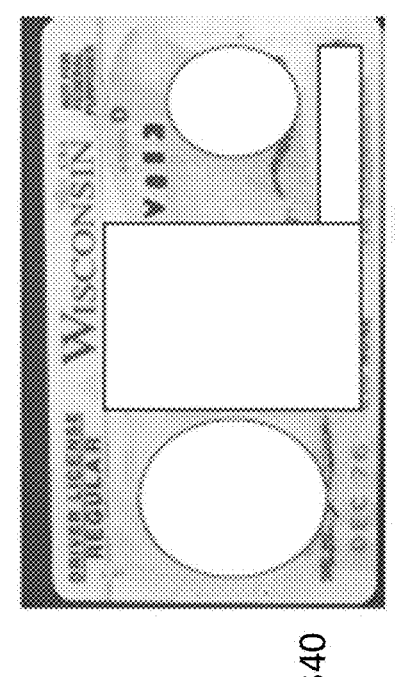
340
310
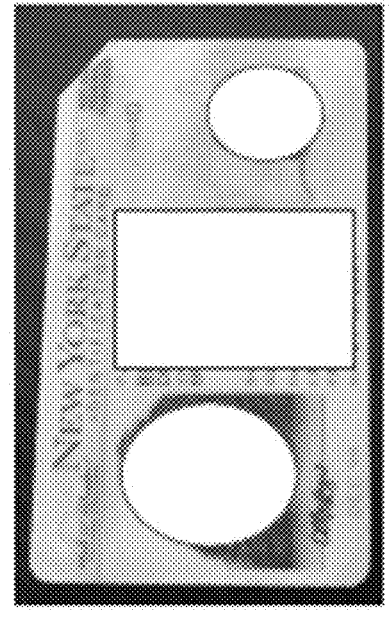
330
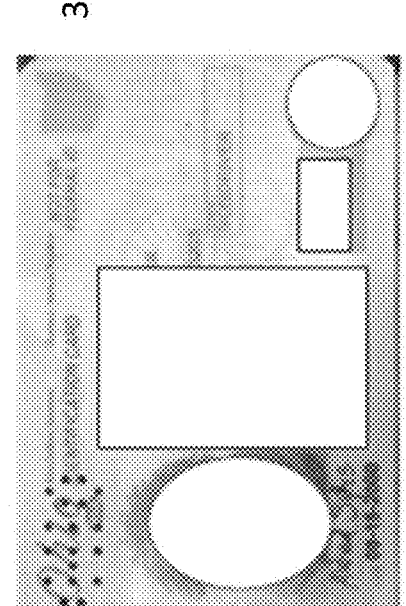
FIG. 3

540

Paste the shape onto a random location on the ID document

530

Locate a random position in the background

Extract a desired shape either a circle or words at that location

520

Detect Document Region

510

Start with a real and valid document image

610 Start with a real and valid document image

620 Detect Document Region

630 Locate a random position in the document as top-left point. Compute position of the each keypoint from the top-left position Key point locations of VOID 640 Add holes at each keypoint location

SYSTEM AND METHOD FOR DETECTING INVALID IDENTIFICATION DOCUMENTS USING SYNTHETIC DATA FOR MODEL TRAINING

FIELD OF THE DISCLOSURE

Disclosed embodiments relate to the detection of identification documents that have been invalidated, and more specifically, to the use of machine learning systems and generated synthetic data to train models to accurately detect various indicia of invalidity on such identification documents.

BACKGROUND

Identity verification is often performed in connection with online transactions in order to assess whether the person attempting the transaction is who they say they are. For example, an individual seeking to open a new checking account online may be asked to upload a photographic image of an identity document such as a driver's license for verification prior to the system allowing the transaction to proceed. If the individual is unwilling to provide an image of an identity document or an uploaded identity document can not be verified as establishing sufficient evidence that the individual is who they say they are, then the transaction will typically be rejected.

Once the image has been uploaded, the system proceeds to extract information from the document image in connection with the verification process. In connection with an image of a driver's license, for example, the system may scan the image using OCR or other means so that it can extract first name, last name, date of birth, driver's license number, expiration date and/or any other data contained within the driver's license. The data can then be used by the validation system to verify identity.

One issue that may arise in connection with identity verification in these contexts is that the individual providing the document image may intentionally or unintentionally provide a document that is invalid or expired. While it may be possible in many commercial applications to validate even based on an invalid id (i.e. an expired driver's license) because the embedded data is still viable and may only be somewhat out of date, there are other applications where this is not acceptable. By way of example, in many public sector applications, identity verification must be accomplished only with a valid and current identification document. This is often the case, for example, in mission critical applications where known current data from a current document is required as a precondition for transaction processing.

In cases where in invalid identity documents should be excluded from the verification process, it is thus necessary for the processing systems to detect that the documents are invalid and prevent them from being used in connection with the verification process. Issuers of identity documents such as governmental agencies and other issuing authorities often require expired documents to be surrendered as a condition of receiving a replacement identity document. However, this is not always the case. Some issuing authorities instead require that the document be physically modified in some way to irreversibly designate the document as invalid.

One known example of invalidity designation requires the cutting of a corner off of the document such as a driver's license. Another example is punching a hole or other shape somewhere on the document. Yet another example is punching a large number of smaller holes in the document in the shape of a word such as "VOID" or some other indicia. Many other examples are in use for invalidating different types of documents such as driver's licenses, passports, license plates, etc.

It would be desirable to implement a system functioning with machine learning techniques in which a model can be trained to detect a wide variety of invalidity designations on a wide variety of identity documents. This presents a challenge due to the variations in documents and invalidity designations as well as the requirement to minimize false positives and false negatives when implementing invalid document detection as part of the overall identity verification process.

Unfortunately, when seeking to train a model to detect invalid identification documents, limited source documents with invalidity markings may be available for training such that training would be marginal at best. At the same time, the model must be trained sufficiently to allow for an acceptable level of false positives and false negatives where the acceptable levels are likely to be extremely low. These two competing realities make it difficult with current solutions to consistently detect documents that are truly invalid while at the same time avoiding false positives wherein documents are actually valid but incorrectly detected as invalid.

Thus, as will be understood, there is a need for a system and methodology in which identity verification can be performed using identification document images and wherein images reflecting invalid identification documents are rejected so they are not permitted to be used as a data source in connection with the verification process. It is also important that this system and methodology minimize false positive and false negative results such that only truly invalidated documents are detected as such and processed accordingly.

SUMMARY OF THE INVENTION

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system which processes images representing identification documents such as driver's licenses and passports and uses machine learning techniques wherein a model is trained and the resulting model is used in production to more effectively and accurately detect whether the source identification document has been invalidated.

According to the teachings herein, the disclosed method and system can enhance the detection of invalid identification documents even where there are limited source documents representing invalid documents available for model training.

The system and methodology of the present invention, in some embodiments, may generate synthetic training data from a relatively small number of source document images and use the aforesaid synthetic training data to train a model which is capable of accurately detecting invalided identification documents and avoiding false positives wherein identification documents that are actually valid are designated as invalid.

In some embodiments, the system and methodology of the present invention may generate synthetic training data through various novel techniques and for various types of invalidation indicia including, without limitation, cut corners, punched holes, punched words and VOID markings.

The system and methodology of the present invention, in some embodiments, may detect, locate and classify invalidity indicia on identification documents via a trained model that, in some embodiments, continues to be further trained during production and as additional source identification documents are made available to the system.

According to the teachings of the present invention, the system of the present invention is operable to identify a set of possible invalidation indicia with respect to identification documents which are used to verify identity in connection with various proposed transactions. The system then trains a machine learning model to detect, locate and classify the various invalidation indicia as they may appear on a source identification document. In some embodiments, the model is trained through the use of synthetic data which may be generated through the use of source identification documents that are both valid and invalid.

In some embodiments and with respect to source identification documents that are valid, various techniques for simulating invalidity with known invalidity indicia are applied so as to create a set of synthetic data for model training which represents source identification documents that have been invalidated. In addition, source identification documents that are originally invalidated with a proper invalidity indicia may also be used for model training if and to the extent that these identification documents are available.

According to the teachings herein, the generated synthetic data is employed to train a detector model to detect an invalid source document as well as the location of the invalidity indicia on the document and also the type of invalidity indicia applied to the source document. In some embodiments, the model may then be tested using real source data and refined to minimize false positives based on the use of the processing of the real data. The model can then be further refined with additional real data sets as desired and until the desired accuracy (including the minimization of false positives) is achieved.

Once the system is placed into production, the trained model is applied as against newly provided source identification documents in connection with proposed transactions. The system can then report a likelihood of the source identification document being invalid such that the overall processing of the identity verification analysis can take this into account.

BRIEF DESCRIPTION OF THE DRAWINGS

FIG. 2 is a flowchart illustrating the major steps implemented by the system of the present invention in connection with model training and production usage for invalid identification detection, in some embodiments thereof;

FIG. 3 is an illustration demonstrating exemplary types of invalidation indicia employed for indicating that identification documents are invalid;

DETAILED DESCRIPTION OF THE INVENTION

Figure 1:
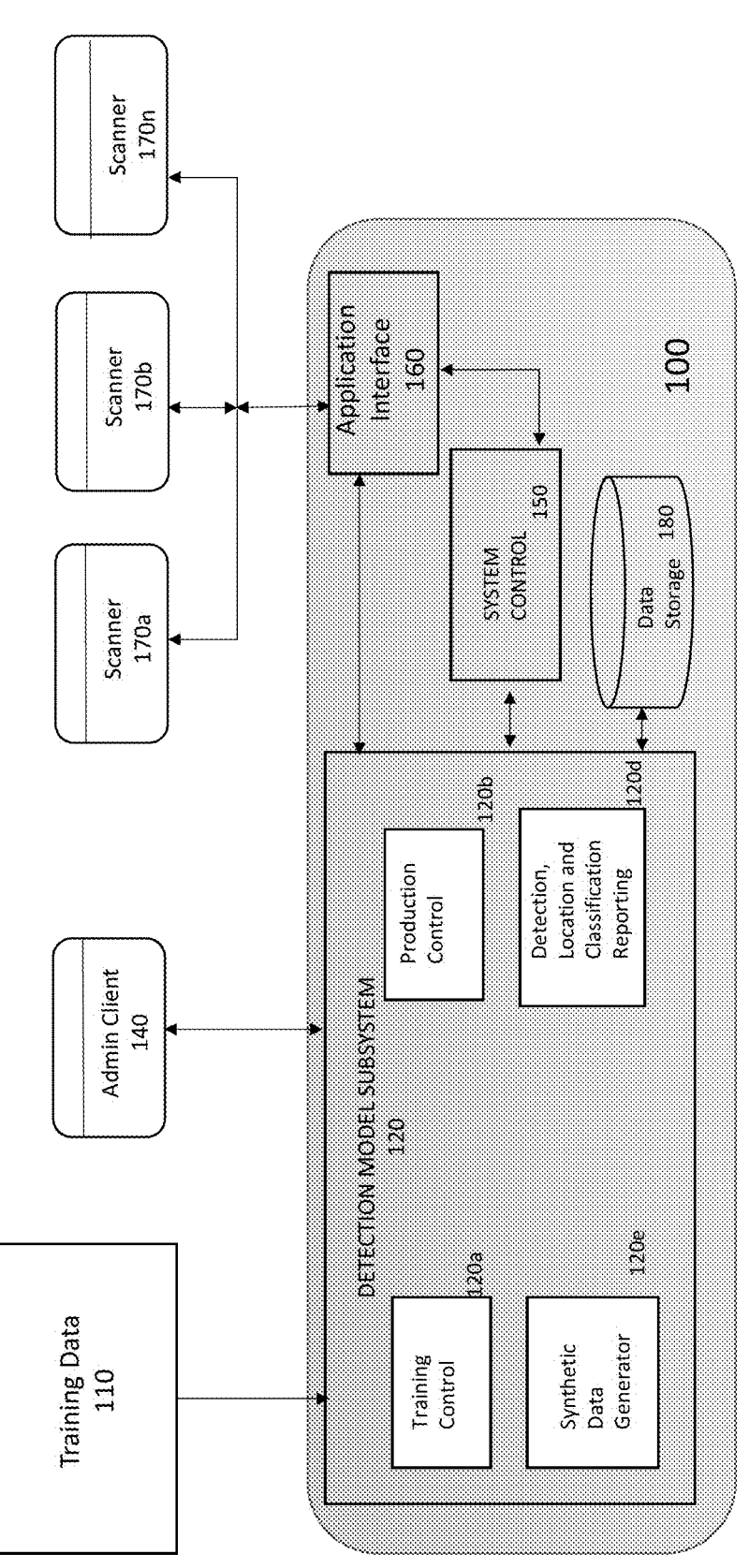
FIG. 1 is a diagram depicting the major components of the system of the present invention, including various elements with which the system of the present invention may interact, in some embodiments thereof.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to the detection of invalidation indicia occurring on an identity document and processing according including rejecting or devaluing the information extracted from an identity document that is detected to include one or more indicia of invalidity. In some embodiments, the methodology calls for first training the system to most effectively identify invalidity indicia, following training of the system, the system is deployed in production to detect, locate, classify and report indicia of invalidity, even where limited source documents containing indicia of invalidity are available for training. In some embodiments, training of the system continues in production as additional documents and images are scanned and extraction is performed. Machine learning techniques are employed in order to train the system to be as effective as possible. In some embodiments, the identification of indicia of invalidity is performed in connection with identity verification and/or fraud detection solutions.

Referring now to FIG. 1, there is illustrated an Invalidity Detection System (IDS) 100 according to one or more embodiments herein. IDS 100 may reside on a single cloud based server although it is also possible for various components of IDS 100 (as described herein) to reside on separate servers. By way of example, IDS 100 may be a computer implemented application which resides on a computing server or other computing platform. As will be apparent from the discussion herein, IDS 100 may include and/or implement all appropriate software and/or hardware for carrying out its invalidity detection functionalities and related capabilities. Operation of IDS 100 is under the control of system control 150.

IDS 100 preferably includes Detection Model Subsystem (DMS) 120, which itself is comprised of a number of modules as discussed further herein. DMS 120 operates to detect, locate, classify and/or report indicia of invalidity contained in images and documents which are scanned into IDS 100 following training of DMS 120 as more fully described herein. Documents and/or images are scanned into IDS 100 through scanners 170a, 170b . . . 170n which communicate with IDS 100 via application interface 160. Application interface 160 may comprise one or more application programming interfaces (APIs) that permit applications associated with scanners 170 to communicate with IDS 100.

Scanners 170 may be one of many known devices currently available for the purpose of scanning images, documents or any other physical object. Examples of images and documents which fall within the scope and spirit of the present invention include driver's licenses, passports, credit cards, ID cards, social security cards, papers, photos, screen shots and many other physical objects and viewable collections of data from which data can be collected. This invention is limited only by the scope of the claims and may include capture of data from any source for which capture of data is desired and wherein it is also desirable to reject and or devalue data associated with a document believed to be invalid.

It should also be noted that capture of information via scanning according to the teachings of the present invention may be accomplished in various ways. For example, in the case of a driver's license, IDS 100 may capture data either through a scan of the image on the front and/or back of the license where, for example, name, address and other information is listed. Alternatively or in addition, driver's licenses (and other document types) may contain one or more bar codes containing the same or additional information.

Scanners 170 are used to read and capture the information contained on the document/image. Scanners 170 may communicate with IDS 100 via a wired connection or wirelessly. Alternatively, scanners 170 may communicate with a hub (through a wired or wireless connection) and the hub in turn communicates with IDS 100 via the internet or some other public or private network. Examples of scanners 170 which may be used in connection with the systems and methodologies of the present invention include pen wands, slot scanners, CCD scanners, image scanners and laser scanners as well as other devices capable of scanning in images and documents.

IDS 100 may be accessed, in some embodiments, by an administrative client 140 for the purpose of administrating the operation of the IDS 100 including how and when training is performed as well as various operational aspects associated with the handling of images and documents as they are provided to IDS 100 via scanners 170 for the purpose of detecting, locating, classifying and/or reporting the presence of one or more indicia of invalidity in connection with an document be used for identity verification or otherwise. Admin client 140 may comprise a personal computer, a laptop, a handheld computing device such as a smartphone or a tablet or any other similar device.

As will be further detailed in the present description, training data 110 may be provided to IDS 100, and DMS 120 in particular, in order to train DMS 120 to most effectively and accurately detect, locate, classify and/or report indicia of invalidity appearing on a document and/or image thereof. In some embodiments, results obtained from training operations (including, for example, types of invalidity indicia and locations of invalidity indicia associated with certain types of documents) may be stored in data storage 180. In some embodiments, data storage 180 may alternatively or in addition store data associated with the extraction of substantive content extracted from identity documents such as field names, data classifications, typical document layout information and other related data generated during the training and/or production operation of DMS 120 in accordance with the teachings of the present invention. This data may, in some embodiments, be used in connection with the initial and/or ongoing training of DMS 120.

Returning now to the specific components of IDS 100, IDS 100 may include various components for training itself as well as detecting, locating, and classifying indicia of invalidity associated with documents and images thereof to increase the likelihood that documents that have legitimate indicia of invalidity are treated as such and documents that do not have legitimate indicia of invalidity are also treated accordingly.

IDS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to IDS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from scanners 170 and admin client 140 as well as training data 110, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of Detection Model Subsystem (DMS) 120 shown in FIG. 1, DMS 120 includes various components which are described below. Operation(s) of each of these components will be described at a high level now and then in further detail later in the present disclosure.

In some embodiments, DMS 120 includes training control module 120*a*. This module is responsible for managing the training process required to train DMS 120 to recognize and validate various indicia of invalidity on a wide variety of documents and images. This includes processing sample documents and images contained within training data 110 during the training phase and applying machine learning techniques to develop a data set which is used during the production phase to recognize and validate various indicia of invalidity associated with documents and images thereof. In some embodiments, DMS 120 may autogenerate a very large set of synthetic data (example images and documents) based on a base set of training data sourced from training data 110 external to system 100 as more fully described herein.

Alternatively training data 110 may comprise sufficient externally generated data so as to adequately initially train DMS 120. If possible, DMS 120 generates or has made available to it large amounts of sample images and documents which are processed to train the model to recognize indicia of invalidity as they appear on documents and images with the same or similar layouts and/or classifications as they are presented to system 100 during production processing. Alternatively, synthetic data is generated by DMS 120 as more fully described herein and such synthetic data is used to train the model.

So, for example, training control 120*a* may operate to manage the provision of thousands (or some larger or smaller number) of example driver's licenses from various US states and from other countries as part of training data 110. Training data 110 may also include various other document types such as social security cards from various years (possibly with different formats), passports from various countries and other documents and images which may be of a classification/type which could be later seen by system 100 during production for detection of invalidity indicia.

Substantive data contained on these documents and images may comprise personal information such as names, date of birth, address, credit card information, social security number, gender, drivers'license number, etc. and/or other identifying information. Additional details regarding the training process according to the teachings of the present invention in some embodiments are provided below. As noted above, because training requires the use of identifying documents that contain invalidity indicia in various forms, there is a reasonable likelihood that only a limited number of source documents may be available for training.

According to the teachings of the present invention, model training can be accomplished with no or only a very limited number of source documents for the template (e.g. a New York driver's license) through the generation of synthetic data representing identification documents containing various indicia of invalidity as more fully described herein. The generation of this synthetic data is enabled by synthetic data generator 120e and model training employing this synthetic data is under the control of training control 120a.

Detection, Location, Classification and Reporting (DLCR) component 120d is also included within DMS 120 according to the present invention, in some embodiments thereof. DLCR component 120d operates under the control of production control component 120b during production operations and functions to: (1) detect the presence of one or more indicia of invalidity on images of identity documents; (2) if present, determine the location(s) of the indicia of invalidity on the images of identity documents; (3) if present, classify the type(s) of the indicia of invalidity on the images of identity documents; and (4) report any or all of the presence of the indicia, the location of the indicia and/or the classification of the indicia.

In some embodiments, production control 120b operates to continually train and improve the model during production as additional images of identification document images are made available to system 100. In particular, as new images representing both images with and without indicia of invalidity are made available to system 100, the model can be improved to reduce false positives and false negatives with respect to the presence of the indicia of invalidity as well as to improve classification and location determinations.

In some embodiments, during production, upon a scan of a document or image by reader 170 and under the direction of system control 150, DMS 120 implements the trained model and, in particular, DLCR component 120d functions to detect, locate, classify and/or report on indica of invalidity which may be present. The determinations made by DLCR component 120d may, in turn, be stored in data storage 180 for use in further training of DMS 120 and/or for downstream use in connection with another application, system or subsystem. In the case of downstream use of the DLCR results, the results may be communicated by system 100 to another system, such as an identity verification or fraud detection system or other application where the DLCR results are of use in processing.

Turning now to FIG. 2 and in connection therewith, a more detailed discussion of the process for training the model of the present invention in some embodiments is now provided. The following discussion assumes training based upon an identity document such as a driver's license for the purpose of identity verification. One of ordinary skill in the art will readily recognize that the teachings of the present invention may be applied in many other contexts including in any case where there exists a document, image, label or other physical element capable of being scanned with the goal of accurately detecting, locating and classifying indicia of invalidity from similar documents, labels or other physical elements which are provided to IDS 100 in a production environment once the system has been trained.

The following discussion assumes that a limited number of source documents with indicia of invalidity are available for training. In this case, the system and methodology of the present invention generates synthetic data for use in training the model associated with the specific template using a limited number of source documents which contain indicia of invalidity. In some embodiments, model training may also use source documents that do not have indicia of invalidity but otherwise generally reflect the generally expected layout and data fields for the specific template document (e.g. New York driver's license).

In some embodiments of the present invention, DMS 120 is trained at step 210 by first identifying the types (classifications) of invalidity indicia. These types may include, for example, punched holes or other punched shapes, cut corners, punched small holes forming words or shapes, "void" markings and other methodologies used and/or approved for invalidating the specific document type. Other types of invalidity indicia are also possible without departing from the scope or spirit of the present invention.

Next, at step 220, identification documents that have not been invalidated may be synthetically "invalidated" in various ways as more fully described below resulting in a set of images that can be used to train the model with respect to recognizing invalid identification documents during production. At step 230, the generated synthetic data is used to train the model to detect, locate, and classify invalidity indicia as they may appear on document types for which the model has been trained. In addition to the synthetically generated images that contain indicia of invalidity, in some embodiments, the model may also be trained with original source documents that do not contain any indicia of invalidity.

Next at step 240, the trained model is tested as against a first set of real data as if being used in production. This step involves analyzing images of both the front and the back of the same identification document and determining the location of indicia or markings in the images as well as determining whether these front and back locations match (i.e. line up) so as to provide confidence that the indicia is, in fact, a true indicia of invalidity. For example, if there are small holes on both the front and back of a document as reflected by the two images of the document (front and back) but the location of the holes do not line up by location, then it implies that the actual document does not have the set of holes actually punched fully through the document. In the case they don't match, it is assumed that the detected holes are imaging artifacts or some other marking on either or both of the front and back of the document that is not intended to indicate invalidity.

As noted in FIG. 2 at step 240, any "holes" detected that don't match between front and back locations are noted as inconsistent and would otherwise result in false positives wherein a document is considered invalid when it really is not. Next, at step 250, this inconsistent data is used to re-train the model so that it can recognize these markings that are not actually invalidity indicia so that the underlying documents containing them are not viewed as invalid.

Once retraining has been completed, at step 260, the model is once again tested against a second set of real data to assess the accuracy of correctly detecting, locating and classifying indicia of invalidity on identification documents. One or more metrics may be applied to determine if the model is sufficiently trained so as to enter production. These metrics may include, for example, a very small percentage of false positives, a very small percentage of false negatives, a very small error in location determination, a very small error in indicia type classification or some combination of any or all of the foregoing.

The re-training and testing portion of the process may continue until the desired metrics are achieved at which point the model may be placed into production and used in connection with real identification documents provided to system 100 such that system 100 can accurately determine whether it is likely that the documents have been invalidated or not. This information, as well as information regarding the location and classification of the invalidity indicia can be used by other subsystems and/or reported to other down-stream systems which benefit from knowing whether the identification document proffered should be used and the weight that should be applied to the information contained within the document.

As noted above and as discussed in more detail below, training of the model can continue while in the production phase using the benefit of production operations to enhance the performance of the model.

In particular and in some embodiments, training occurs to a large part prior to placing system 100 in production but the effectiveness of the model may continue to be enhanced during the production phase using the inputs received during usage in production to continually enhance the model in order to achieve better and better results with continued usage. These enhancements and the continued betterment of the model is achieved through machine learning techniques as applied to a machine learning model.

A "machine learning model" or "model" as used herein, refers to a construct that is trained using training data to make predictions or provide probabilities for new data items, whether or not the new data items were included in the training data. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

Data sourced from production operations may, for example, be stored in data storage 180 for use during production processing of documents and images. So, for example, as DMS 120 continues to get better trained on New York driver's licenses and the types of invalidity indicia that may be applied to these licenses when they expire or are otherwise considered to be invalid, these learnings can be stored in data storage 180 for later usage. As additional document types are made available to IDS 100 either during training or during production, or both, the model, as represented in the stored data structure contained within data storage 180, for example, can be continually improved and broadened in terms of scope of documents and images for which it is trained.

A single IDS 100, then, may be trained to process a multitude of documents types such as driver's licenses from various states and countries, passports from various countries, social security cards, birth certificates from various jurisdictions and a practically unlimited set of other documents and images where validity/invalidity information associated with the document may be useful in downstream applications.

According to the teachings of the present invention, in some embodiments thereof, the trained model is configured to identify patterns and features in the training data to enhance the model's understanding of expected layouts, data fields and data types associated with various classifications of documents and images. Therefore, at the time of production, the model applies these learned patterns and features to examples in the wild, and detects, locates and classifies indicia of invalidity which may appear on these documents.

With reference now to FIG. 3, exemplary indicia of invalidity which may be detected, located and classified by the system of the present invention are shown. New York driver's license 310 shows a cut corner in the upper right corner. Illinois driver's license 320 shows a through punched hole towards the upper right side of the document. Ohio driver's license 330 shows a set of small holes through punched and which form the word "OHIO" in the upper left corner. Wisconsin driver's license 340 shows a through punched word "VOID" in the right side of the license document. As will be readily apparent, these are just examples and various other indicia of invalidity can be trained and processed according to the teachings of the present invention in its various embodiments.

Figure 4:
FIG. 4 is an illustration showing the backside of an identification document that has been invalidated according to one known technique for indicating that such identification document is invalid.

With reference now to FIG. 4, yet another example of an indicia of invalidity is illustrated. In this case, small holes forming the upside down word "VOID" are through punched across the bar code portion on the back of the license document. This methodology for invalidating a document has the additional benefit of making the bar code unreadable and thus unlikely to be used in connection with applications that are expecting data from only a valid identification document.

Figure 5A:
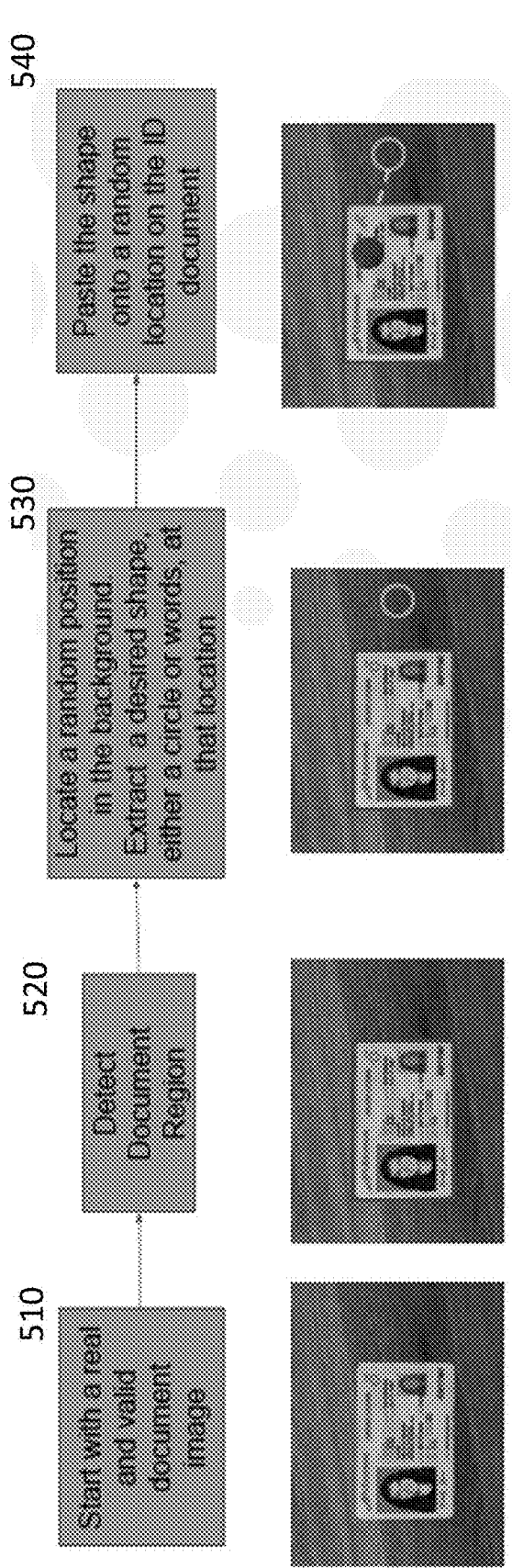
FIG. 5a is an illustration of the process for generating synthetic data used for model training when document invalidation is accomplished using punched holes or words according to the teachings of the present invention, in some embodiments thereof.

Turning now to FIG. 5a, a diagram illustrating the process steps employed by synthetic data generator 120e, in some embodiments, for generating synthetic training data (according to process step 220 in FIG. 2) associated with a through-punched hole as an indica of invalidity is provided. At step 510, an exemplary real document image is used as the starting point. This may be, for example, a valid Arizona driver's license as shown in FIG. 5a. The document image is presented with a selected background. In the case of FIG. 5a, a wood grain background type is used as one example. According to the teachings of the present invention, the same process to be described may be used with the same starting document but with a great many varieties of backgrounds which enables the generation of large amounts of synthetic data which may be used for training. So, for example, the process in FIG. 5a (steps 510-540) is preferably repeated many times with the same driver's license but on a number of different backgrounds and also with a number of different driver's licenses on a variety of backgrounds.

In some embodiments, these driver's licenses may be all or mostly examples of documents without indicia of invalidity wherein the process shown in FIG. 5a is used to generate synthetic training data comprising documents with synthetically generated indicia of invalidity. It is also possible to use real documents that have real indicia of invalidity in connection with the model training process to the extent that such documents (e.g. driver's licenses) are available.

Next, at step 520, the system of the present invention detects and selects the region of the image which includes the actual document and excludes the part of the background where the document does not overlie the background. This can be accomplished through known image processing methodologies such as an object detector or a segmentation model to detect the document foreground.

At the next step, 530, a random position in the background which is not overlayed by the document is selected and a desired shape type is placed at that location. In the example of FIG. 5*a*, a small circle (representing a potential indica of invalidity for which the model is to be trained upon) is placed at a location on the background which is to the right of the document.

At step 540, the shape is pasted onto a random location on the document portion of the image. This results in a synthetically generated image which provides one example of a document that has been invalidated in the proper way using a recognized and valid indicia of invalidity. This image, along with the location and type of indicia, is then used at step 230 in FIG. 2 to train the model. As noted above, this synthetically generated image represents just one of a large universe of synthetically generated images that are used for model training. Synthetic images vary by, for example: (1) different source documents; (2) different backgrounds; (3) different indicia of invalidity; (4) different locations on the background used to extract a shape; and (5) different pasting locations on the document for pasting the extracted shape.

The process for generating synthetic data according to the steps in FIG. 5*a* can, for example, also be applied to other types of indicia of invalidity. For example, it could be applied to punched shapes other than holes, a punched word such as "VOID" and other indicia of invalidity.

Figure 5B:
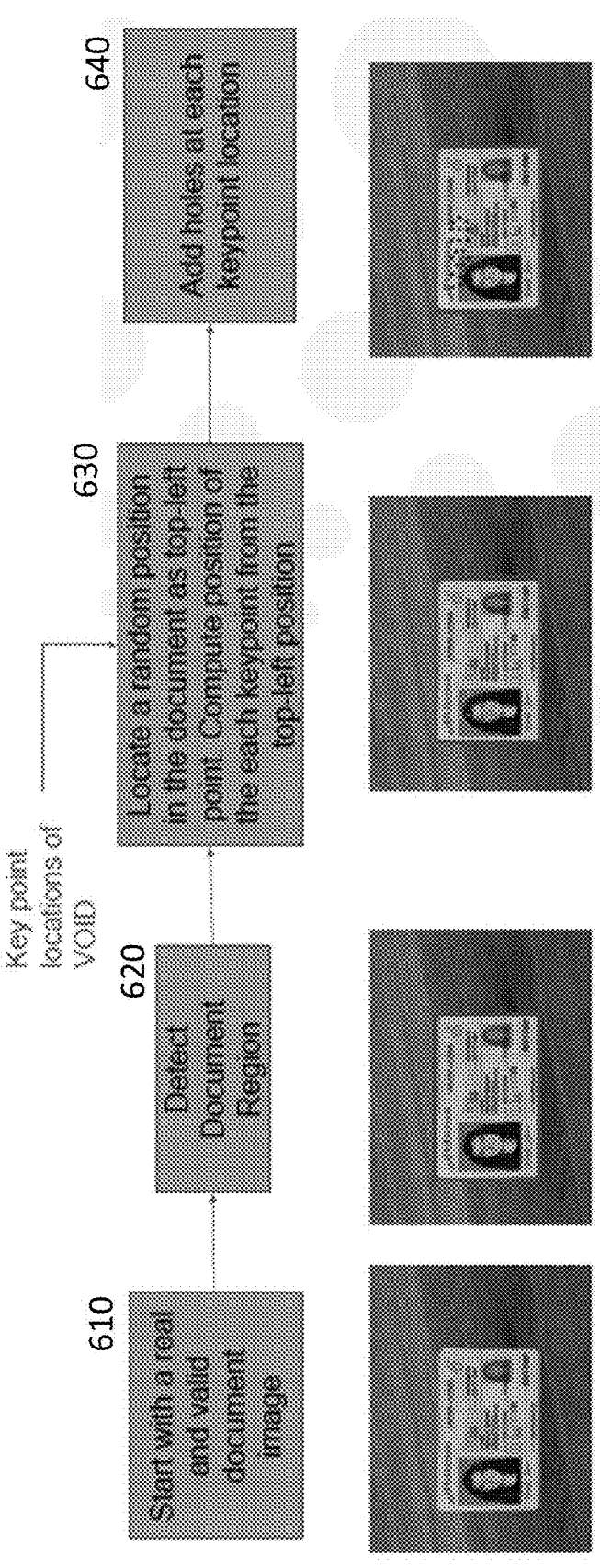
FIG. 5b is an illustration of the process for generating synthetic data used for model training when document invalidation is accomplished using punched holes forming the word "VOID" according to the teachings of the present invention, in some embodiments thereof.

With reference now to FIG. 5*b*, a diagram illustrating the process steps employed by synthetic data generator 120*e*, in some embodiments, for generating synthetic training data (according to process step 220 in FIG. 2) associated with a set of small punched holes forming a word or shape as an indica of invalidity is provided. At step 610, an exemplary real document image is used as the starting point. This may be, for example, a valid Arizona driver's license as shown in FIG. 5*b*. The document image is presented with a selected background. In the case of FIG. 5*b*, a wood grain background type is used as one example. According to the teachings of the present invention, the same process to be described may be used with the same starting document but with a great many varieties of backgrounds which enables the generation of large amounts of synthetic data which may be used for training. So, for example, the process in FIG. 5*b* (steps 610-640) is preferably repeated many times with the same driver's license but on a number of different backgrounds and also with a number of different driver's licenses on a variety of backgrounds.

In some embodiments, these driver's licenses may be all or mostly examples of documents without indicia of invalidity wherein the process shown in FIG. 5*b* is used to generate synthetic training data comprising documents with synthetically generated indicia of invalidity. It is also possible to use real documents that have real indicia of invalidity in connection with the model training process to the extent that such documents (e.g. driver's licenses) are available.

Next, at step 620, the system of the present invention detects and selects the region of the image which includes the actual document and excludes the part of the background where the document does not overlie the background. This can be accomplished through known image processing methodologies such as an object detector or a segmentation model to detect the document foreground. At the next step,

630, a random position in the background which is not overlayed by the document is selected, a small hole is extracted from that location and the hole extracted from the background is pasted on the document at a randomly selected reference point. This point acts as the top-leftmost hole in the word "VOID" (or some other designated word). At step 640, the absolute location of the remaining holes of the word "VOID" (or other designated word) are computed from the relative key point locations using the top-leftmost reference point. The key points are extracted from a template invalidated ID image, which had been invalidated using the punched holes forming the word "VOID" or other designated word.

The process for generating synthetic data according to the steps in FIG. 5*b* can, for example, also be applied to other types of indicia of invalidity. For example, it could be applied to any pattern of small punched shape including, for example, a set of punched holes forming the word "ARIZONA" or some other word or shape as well as various other indicia of invalidity.

Figure 5C:
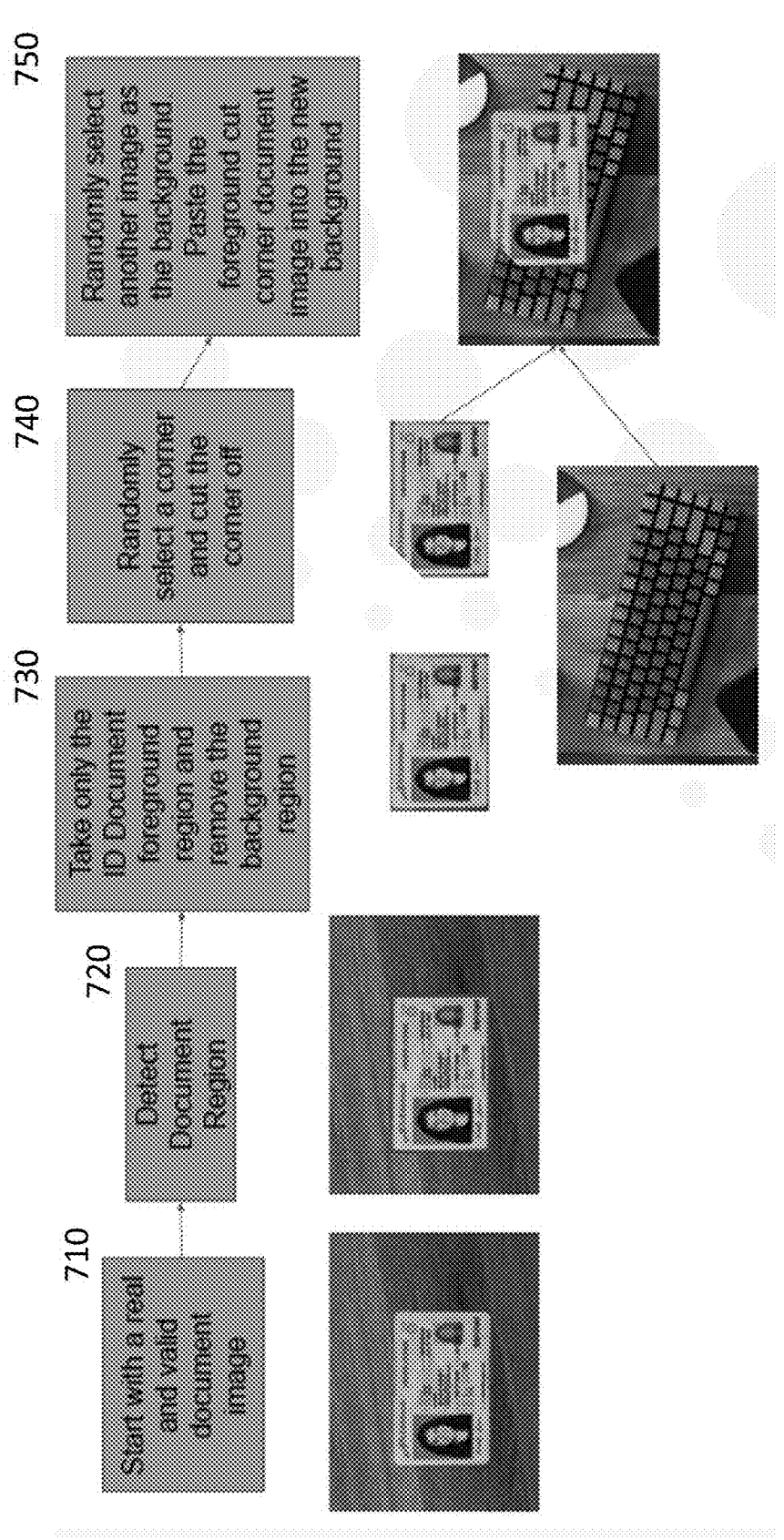
FIG. 5c is an illustration of the process for generating synthetic data used for model training when document invalidation is accomplished using a cut corner according to the teachings of the present invention, in some embodiments thereof.

With reference now to FIG. 5*c*, a diagram illustrating the process steps employed by synthetic data generator 120*e*, in some embodiments, for generating synthetic training data (according to process step 220 in FIG. 2) associated with a cut corner as an indica of invalidity is provided. At step 710, an exemplary real document image is used as the starting point. This may be, for example, a valid Arizona driver's license as shown in FIG. 5*c*. The document image is presented with a selected background. In the case of FIG. 5*c*, a wood grain background type is used as one example. According to the teachings of the present invention, the same process to be described may be used with the same starting document but with a great many varieties of backgrounds which enables the generation of large amounts of synthetic data which may be used for training. So, for example, the process in FIG. 5*c* (steps 710-740) is preferably repeated many times with the same driver's license but on a number of different backgrounds and also with a number of different driver's licenses on a variety of backgrounds. In addition, various examples of cut corner locations (each of the four possible corners) as well as cuts of different angles can be used to generate the synthetic data set.

In some embodiments, these driver's licenses may be all or mostly examples of documents without indicia of invalidity wherein the process shown in FIG. 5*c* is used to generate synthetic training data comprising documents with synthetically generated indicia of invalidity. It is also possible to use real documents that have real indicia of invalidity (i.e. real cut corners) in connection with the model training process to the extent that such documents (e.g. driver's licenses) are available.

Next, at step 720, the system of the present invention detects and selects the region of the image which includes the actual document and excludes the part of the background where the document does not overlie the background. This can be accomplished through known image processing methodologies such as an object detector or a segmentation model to detect the document foreground.

At the next step, 730, an image with only the extracted document region and without the background is generated. At step 740, a random corner is selected and an image with that cut corner is generated. In some embodiments, each of the possible corners is cut off to generate different training images and in addition, the cuts may be at different angles for a more robust training function.

At step 750, another image with a different background ("Background 2") from the one used in step 710 is generated and the resulting image from the end of step 740 is pasted over Background 2. This results in a synthetically generated image which provides one example of a document that has been invalidated in the proper way using a cut corner as a valid indicia of invalidity. This image is then used at step 230 in FIG. 2 to train the model. As noted above, this synthetically generated image represents just one of a large universe of synthetically generated images that are used for model training. Synthetic images vary by, for example: (1) different source documents; (2) different initial backgrounds; (3) different Background 2's; (4) different corners cut; and (5) different pasting locations on the Background 2 for pasting the foreground cut corner document.

In connection with any of the processes for generating synthetic training data as described in FIGS. 5a, 5b and 5c reflecting step 230 in FIG. 2, the overall process of FIG. 2 can then continue to step 240 after the applicable synthetic training data has been generated. The later steps in the FIG. 2 process which are intended to minimize false positives and false negatives can then also be applied to further train and improve the model with respect to all of the different document types and indicia of invalidity which may be applied to them.

According to the teachings of the present invention, through the generation of large combinations of visual variations based on one or more original source documents, a large amount of synthetic data can be produced and used by the model such that the model is effective in connection with recognizing variations in types and locations of indicia of invalidity on documents presented in connection with identity verification or for other purposes. As discussed above, in some embodiments, it is desirable to: (1) detect that one or more indicia of invalidity appears on a document image; (2) determine the location(s) on the document where the one or more indicia of invalidity exist, if applicable; (3) determine the classification/type of indicia of invalidity appearing on the document, if applicable; and (4) report the foregoing information to a downstream application or process so that it can taken into account.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system configured to detect invalidity indicia appearing on an identity document, the system comprising:

one or more processors configured to execute computer program modules comprising a first model and a physical storage capability;

a training computer program module operative to receive at least one source of training identity document data and process said training identity document data in combination with at least one background therefor to generate synthetic invalidity indicia training data comprising one or more known invalidity designations associated with said training identity document data and storing said synthetic invalidity indicia training data in an invalidity indicia database comprising said first model;

an invalidity detection computer program module operative to, based on said one or more said known invalidity designations, determine a presence or lack thereof of one or more said known invalidity designations on said identity document through a matching of said synthetic invalidity indicia training data as against data extracted from said identity document;

wherein said processing of said training identity document data in combination with at least one background therefor to generate synthetic invalidity indicia training data comprises an addition of a synthetically generated known invalidity designation to said training identity document data and a placement of said training identity document data, having said addition of said synthetically generated known invalidity designation, on said at least one background.

2. The system of claim 1 wherein said invalidity detection computer program module is further operative to determine a location of said known invalidity designation as said known invalidity designation may appear on said identity document.

3. The system of claim 1 wherein said invalidity detection computer program module is further operative to classify a type of said known invalidity designation as said known invalidity designation may appear on said identity document.

4. The system of claim 1 wherein said known invalidity designation comprises one or more of the following: cut corner, punched shape, plurality of punched holes forming a shape or a word, punched word or punched shape.

5. The system of claim 1 wherein said identity document comprises one of the following: driver's license, passport, social security card, or voter identification card.

6. The system of claim 1 wherein said training identity document data comprises only valid identity documents without any known invalidity designations.

7. The system of 1 wherein said training identity document data comprises both valid identity documents without any known invalidity designations and invalid identity documents including at least one known invalidity designation.

8. The system of claim 1 wherein said training computer program module is further operative to iteratively test and refine said first model using real source data to minimize false positive results associated with identity documents not containing known invalidity designations.

9. The system of claim 8 wherein said iterative testing and refining of said first model comprises matching of a location of each of respective holes on both the front and back of a document.

10. The system of claim 1 wherein said first model is refined during production operation using data obtained in connection with said production operation.

11. A computer-implemented method of generating identity verification results for identities included in online transactions, the method being implemented in a computer system comprising one or more processors configured to execute computer program modules comprising a first model and a physical storage capability, and the method comprising the steps of:

receiving at least one source of training identity document data and processing said training identity document data in combination with at least one background therefor to generate synthetic invalidity indicia training data comprising one or more known invalidity designations associated with said training identity document data and storing said synthetic invalidity indicia training data in an invalidity indicia database comprising said first model;

determining a presence or lack thereof of one or more said known invalidity designations on said identity document through a matching of said synthetic invalidity indicia training data as against data extracted from said identity document based on said one or more known invalidity designations;

wherein said processing of said training identity document data in combination with at least one background therefor to generate synthetic invalidity indicia training data comprises an addition of a synthetically generated known invalidity designation to said training identity document data and a placement of said training identity document data having said addition of said synthetically generated known invalidity designation, on said at least one background.

12. The method of claim 11 further including the step of determining the location of said known invalidity designation as said known invalidity designation may appear on said identity document.

13. The method of claim 11 further comprising the step of classifying a type of said known invalidity designation as said known invalidity designation may appear on said identity document.

14. The method of claim 11 wherein said known invalidity designation comprises one or more of the following: cut corner, punched shape, plurality of punched holes forming a shape or a word, punched word or punched shape.

15. The method of claim 11 wherein said identity document comprises one of the following: driver's license, passport, social security card, or voter identification card.

16. The method of claim 11 wherein said training identity document data comprises only valid identity documents without any known invalidity designations.

17. The method of claim 11 wherein said training identity document data comprises both valid identity documents without any known invalidity designations and invalid identity documents including at least one known invalidity designation.

18. The method of claim 11 further comprising the step of iteratively testing and refining said first model using real source data to minimize false positive results associated with identity documents not containing known invalidity designations.

19. The method of claim 18 wherein said iterative testing and refining of said first model comprises matching of a location of each of respective holes on both the front and back of a document.

20. The method of claim 11 wherein said first model is refined during production operation using data obtained in connection with said production operation.

* * * * *